US011592027B1

(12) United States Patent
Zhao et al.

(10) Patent No.: US 11,592,027 B1
(45) Date of Patent: Feb. 28, 2023

(54) COMPRESSOR SURGE PREVENTION CONTROL (71) Applicant: Hamilton Sundstrand Corporation, Charlotte, NC (US)

(72) Inventors: Futao Zhao, Farmington, CT (US); Eric Surawski, Hebron, CT (US); Tony Ho, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/540,677

(22) Filed: Dec. 2, 2021

(51) Int. Cl.
F04D 27/02 (2006.01)
F04D 27/00 (2006.01)
F04D 25/06 (2006.01)

(52) U.S. Cl.
CPC ......... *F04D 27/0215* (2013.01); *F04D 25/06* (2013.01); *F04D 27/001* (2013.01); *B64D 2231/02* (2013.01)

(58) Field of Classification Search
None
See application file for complete search history.

(56) References Cited

U.S. PATENT DOCUMENTS

| 4,989,403 | A | 2/1991 | Rodgers |
| 5,611,664 | A | 3/1997 | Haugen |
| 8,287,232 | B2 | 10/2012 | Gu et al. |
| 10,167,971 | B2 | 1/2019 | Fletcher et al. |
| 10,393,281 | B2 | 8/2019 | Richardson et al. |
| 10,865,715 | B2 | 12/2020 | Greenberg et al. |
| 11,041,501 | B2 | 6/2021 | Atkey et al. |

FOREIGN PATENT DOCUMENTS

| EP | 3483450 A1 * | 5/2019 | ............. F01D 5/048 |
| KR | 20200109366 A * | 9/2020 | |
| WO | WO-2022012866 A1 * | 1/2022 | |

* cited by examiner

*Primary Examiner* — Michael Lebentritt
(74) *Attorney, Agent, or Firm* — Cantor Colburn LLP (57) ABSTRACT

Pneumatic air systems for use onboard aircraft include a compressor configured to receive air from an air supply and increase a pressure of said received air to generate compressed air, a heat exchanger configured to receive the compressed air as a first working fluid and a treating air as a second working fluid, the heat exchanger configured to convert the compressed air to compressed and temperature treated air, one or more aircraft systems configured to receive the compressed and temperature treated air, and a surge prevention circuit arranged to prevent surge of air at the compressor, wherein the surge prevention circuit comprises a mechanical valve that is actuated based on a detected pressure within a sense line operably coupled to the mechanical valve.

20 Claims, 5 Drawing Sheets

COMPRESSOR SURGE PREVENTION CONTROL

BACKGROUND

The subject matter disclosed herein generally relates to aircraft systems and, more particularly, to compressors of aircraft and surge prevention control associated with such compressors.

Onboard an aircraft, compressed air from a compressor may be delivered to a pneumatic air system for use onboard the aircraft. Compressor surge may occur when the air operation system instantly shuts off its airflow receiving system(s), causing a backflow or surge. Conventionally, a feedback control system is designed with high bandwidth to protect the compressor surge. Such feedback control systems may require high cost and/or high complexity for implementation to ensure that the compressor or other parts of the airflow systems are not damaged during the surge-protection control operations. Improved surge protection and/or surge prevention systems may be desirable.

SUMMARY

According to some embodiments, pneumatic air systems for use onboard aircraft are provided. The pneumatic air systems include a compressor configured to receive air from an air supply and increase a pressure of said received air to generate compressed air, a heat exchanger configured to receive the compressed air as a first working fluid and a treating air as a second working fluid, the heat exchanger configured to convert the compressed air to compressed and temperature treated air, one or more aircraft systems configured to receive the compressed and temperature treated air, and a surge prevention circuit arranged to prevent surge of air at the compressor, wherein the surge prevention circuit comprises a mechanical valve that is actuated based on a detected pressure within a sense line operably coupled to the mechanical valve.

In addition to one or more of the features described herein, or as an alternative, further embodiments of the pneumatic air systems may include an electric motor operably coupled to the compressor and configured to drive operation of the compressor.

In addition to one or more of the features described herein, or as an alternative, further embodiments of the pneumatic air systems may include that the electric motor is configured to drive the compressor at a constant power.

In addition to one or more of the features described herein, or as an alternative, further embodiments of the pneumatic air systems may include a motor controller operably coupled to the electric motor.

In addition to one or more of the features described herein, or as an alternative, further embodiments of the pneumatic air systems may include that the sensor line is fluidly coupled to a location upstream of the heat exchanger and monitors a pressure of the compressed air.

In addition to one or more of the features described herein, or as an alternative, further embodiments of the pneumatic air systems may include that the sensor line is fluidly coupled to a location downstream of the heat exchanger and monitors a pressure of the compressed and temperature treated air.

In addition to one or more of the features described herein, or as an alternative, further embodiments of the pneumatic air systems may include that the one or more aircraft systems comprises one or more of an onboard oxygen generating system, an onboard inert gas generation system, or an ice prevention system.

In addition to one or more of the features described herein, or as an alternative, further embodiments of the pneumatic air systems may include that the air supply for the compressor and a source of the treating air is the same air source.

In addition to one or more of the features described herein, or as an alternative, further embodiments of the pneumatic air systems may include that the air supply for the compressor is ram air.

In addition to one or more of the features described herein, or as an alternative, further embodiments of the pneumatic air systems may include that a source of the treating air for the second working fluid of the heat exchanger is ram air.

In addition to one or more of the features described herein, or as an alternative, further embodiments of the pneumatic air systems may include that the surge prevention circuit is configured to direct air overboard when the mechanical valve is in an open state.

In addition to one or more of the features described herein, or as an alternative, further embodiments of the pneumatic air systems may include that the mechanical valve is configured to be in a closed state unless a predetermined pressure threshold is detected within the sense line.

According to some embodiments, aircraft are provided. The Aircraft include an aircraft body and a pneumatic air system installed on the aircraft. The pneumatic air system includes a compressor configured to receive air from an air supply and increase a pressure of said received air to generate compressed air, a heat exchanger configured to receive the compressed air as a first working fluid and a treating air as a second working fluid, the heat exchanger configured to convert the compressed air to compressed and temperature treated air, one or more aircraft systems configured to receive the compressed and temperature treated air, and a surge prevention circuit arranged to prevent surge of air at the compressor, wherein the surge prevention circuit comprises a mechanical valve that is actuated based on a detected pressure within a sense line operably coupled to the mechanical valve.

In addition to one or more of the features described herein, or as an alternative, further embodiments of the aircraft may include that the aircraft is a fixed winged aircraft.

In addition to one or more of the features described herein, or as an alternative, further embodiments of the aircraft may include that the aircraft is a rotary blade aircraft.

In addition to one or more of the features described herein, or as an alternative, further embodiments of the aircraft may include a ram air duct, wherein the heat exchanger is arranged within the ram air duct.

In addition to one or more of the features described herein, or as an alternative, further embodiments of the aircraft may include that the one or more aircraft systems comprises one or more of an onboard oxygen generating system, an onboard inert gas generation system, or an ice prevention system.

In addition to one or more of the features described herein, or as an alternative, further embodiments of the aircraft may include an electric motor operably coupled to the compressor and configured to drive operation of the compressor.

In addition to one or more of the features described herein, or as an alternative, further embodiments of the aircraft may include that that the electric motor is configured to drive the compressor at a constant power.

In addition to one or more of the features described herein, or as an alternative, further embodiments of the aircraft may include that the surge prevention circuit is configured to direct air overboard when the mechanical valve is in an open state.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
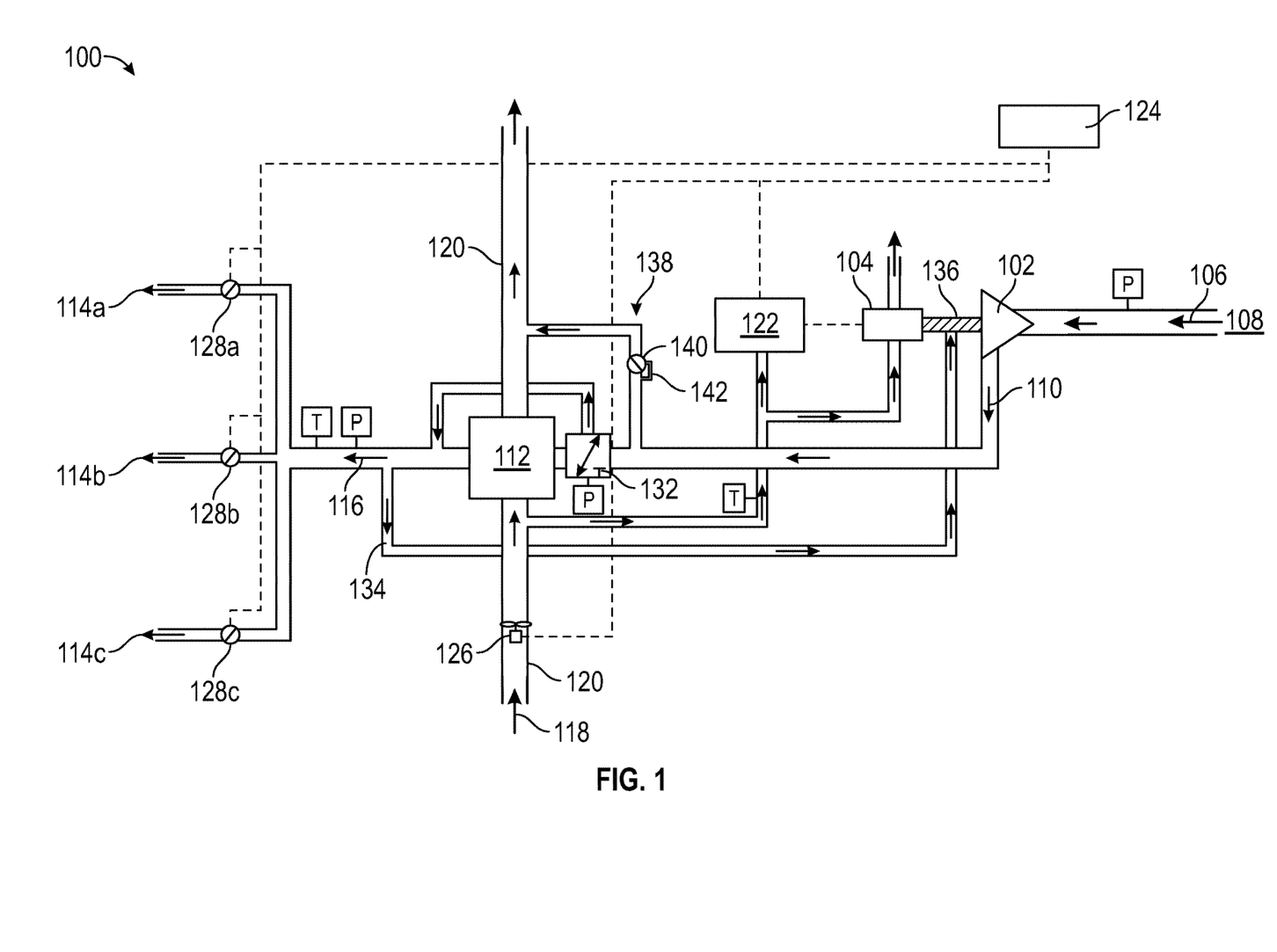
FIG. 1 is a schematic diagram of a pneumatic air system of an aircraft in accordance with an embodiment of the present disclosure.

Referring now to FIG. 1, a schematic diagram of a pneumatic air system 100 of an aircraft, in accordance with an embodiment of the present disclosure. The pneumatic air system 100 includes a compressor 102 that is driven by a motor 104. In some embodiments, the motor 104 may be an electric motor (i.e., not a combustion or Brayton cycle engine). The compressor 102 is configured to receive air 106 from an air supply 108 to compress such air 106 to increase a pressure thereof to generate compressed air 110. The compressed air 110 is directed through a heat exchanger 112 where the air is temperature treated prior to supplying treated compressed air to one or more aircraft systems 114a-c. The aircraft systems 114a-c can include, for example and without limitation, onboard oxygen generating systems, onboard inert gas generation systems, ice prevention systems, or other systems, as will be appreciated by those of skill in the art. The aircraft systems 114a-c may be configured to receive a compressed and temperature treated air 116 in order to perform aircraft operational functions.

The heat exchanger 112 receives the compressed air 110 as a first working fluid and treating air 118 as a second working fluid to generate, at least, the compressed and temperature treated air 116. As such, in this illustrative embodiment, the heat exchanger 112 is arranged in or along a treating air duct 120. In some embodiments, the treating air duct 120 is a ram air duct. However, depending on aircraft and/or engine configurations, the treating air duct 120 may be any air duct or path onboard the aircraft, as will be appreciated by those of skill in the art. In some non-limiting embodiments, the air supply 108 may be from the treating air duct 120 and thus the air 106 received at the compressor 102 may be treating air 118. For example, in a ram air system, ram air may be used both for the air supplied into the compressor (air 106) and also the treating air in the heat exchanger (e.g., both first and second working fluids). In other embodiments, the air supply 108 configured to supply the air 106 to the compressor 102 may be a different air source than a treating air duct.

The motor 104 that drives operation of the compressor 102 may be controlled by a motor controller 122. The motor controller 122 may be an electronics component or system that is operably connected to a system controller 124 that is configured to control operation of one or more onboard systems, including the pneumatic air system 100. The system controller 124, as shown, is operably connected to the motor controller 122, a blower fan 126 arranged within the treating air duct 120, compressed air valves 128a-c that are controlled to supply the compressed and temperature treated air 116 to the one or more aircraft systems 114a-c. A portion of the treating air 118 may be extracted from the treating air duct 120 to provide cooling to the motor 104 and/or the motor controller 122, as illustratively shown.

In operation, if the system controller 124 determines that the temperature of the compressed and temperature treated air 116 must be further adjusted in temperature or if the output from the heat exchanger 112 is not correct, a portion of the compressed air 110 may be bypassed around the heat exchanger 112 through a bypass line 130, with such bypass controlled by a bypass valve 132 arranged upstream from the heat exchanger 112. Further, a portion of the compressed and temperature treated air 116 may be directed along a bearing cooling path 134 to bearings 136 arranged about a shaft that connects the motor 104 to the compressor 102.

During operation, compressor surge may occur due to a backflow in the pneumatic air system 100 downstream of the compressor 102. One cause of such surge may be due to closing of one or more of the compressed air valves 128a-c. This phenomenon is particularly true if all compressed air valves 128a-c are closed, and thus the compressed and temperature treated air 116 cannot be directed to any use. This undirected air may cause surge or backflow into and through the compressor 102, which can cause damage thereto. Conventionally, to prevent such surge, the motor controller 122 and motor 104 are operated to vary the compressor speed. As the compressor 102 approaches surge, the compressor speed may be reduced. This operation is an active control process which may require complex control systems and/or increased costs associated with such controlled operation.

In accordance with embodiments of the present disclosure, however, a passive, mechanical surge prevention system is implemented, using, for example a pneumatic valve or other mechanical valve. As such, the complexity and costs of purge protection may be reduced while ensuring protection of the components of the pneumatic air system 100.

As shown in FIG. 1, a surge prevention circuit 138 is arranged in the pneumatic air system 100. In this non-limiting embodiment, the surge prevention circuit 138 is arranged upstream of the heat exchanger 112 to extract a portion of the compressed air 110 and direct it into the treating air duct 120. The surge prevention circuit 138 includes a surge prevention valve 140 and a sense line 142. The sense line 142 is configured to enable mechanical actuation of the surge prevention valve 140 when a predetermined pressure or range of pressures in the compressed air 110 is detected. That is, if the pressure of the compressed air 110 exceeds a threshold, the increased pressure within the sense line 142 will cause the surge prevention valve 140 to actuate or open and allow a portion of the compressed air 110 to be directed into the treating air duct 120, thus venting pressure from the pneumatic air system 100 and preventing surge at the compressor 102. The surge prevention valve 140 may be an orifice valve, one-way valve, check valve, or the like. In some embodiments, the surge prevention valve 140 may be a mechanical valve (e.g., pneumatic) that is configurable or adjustable to actuate or operate based on one or more different parameters (e.g., pressure, temperature, etc.).

Advantageously, the surge prevention circuit 138 of the present disclosure can be a passive system that does not require complex systems to ensure that surge is avoided. The surge prevention valve 140 in combination with the sense line 142 may be a passive system that is configured to actuate based on the pressure within the sense line 142. When the pressure in the sense line 142 decreases below a threshold value(s), the surge prevention valve 140 will close, ensuring that a desired pressure level is maintained for supplying the compressed and temperature treated air 116 to the one or more aircraft systems 114*a-c* (or not supplied in the event all compressed air valves 128*a-c* are closed).

It is noted that although the surge prevention circuit 138 is configured to extract the compressed air 110 from upstream of the heat exchanger 112 and downstream from the compressor 102 and dump such air into the treating air duct 120, such configuration is not to be limiting. For example, in some embodiments, the extraction of air from the pneumatic air system 100 may be at a location downstream from the heat exchanger 112 (e.g., extract the compressed and temperature treated air 116) and/or the extracted air may be dumped upstream of the heat exchanger 112 in the treating air duct 120.

The surge prevention valve 140 of the surge prevention circuit 138 may be a self-regulating mechanical valve that is designed to receive one or more scheduled pressure references to passively control the pressure at the surge prevention valve 140 to the reference pressure(s). To ensure actuation of the surge prevention valve 140, the sense line 142 can include an orifice configured to open/close based on a differential pressure across the orifice.

Figure 2:
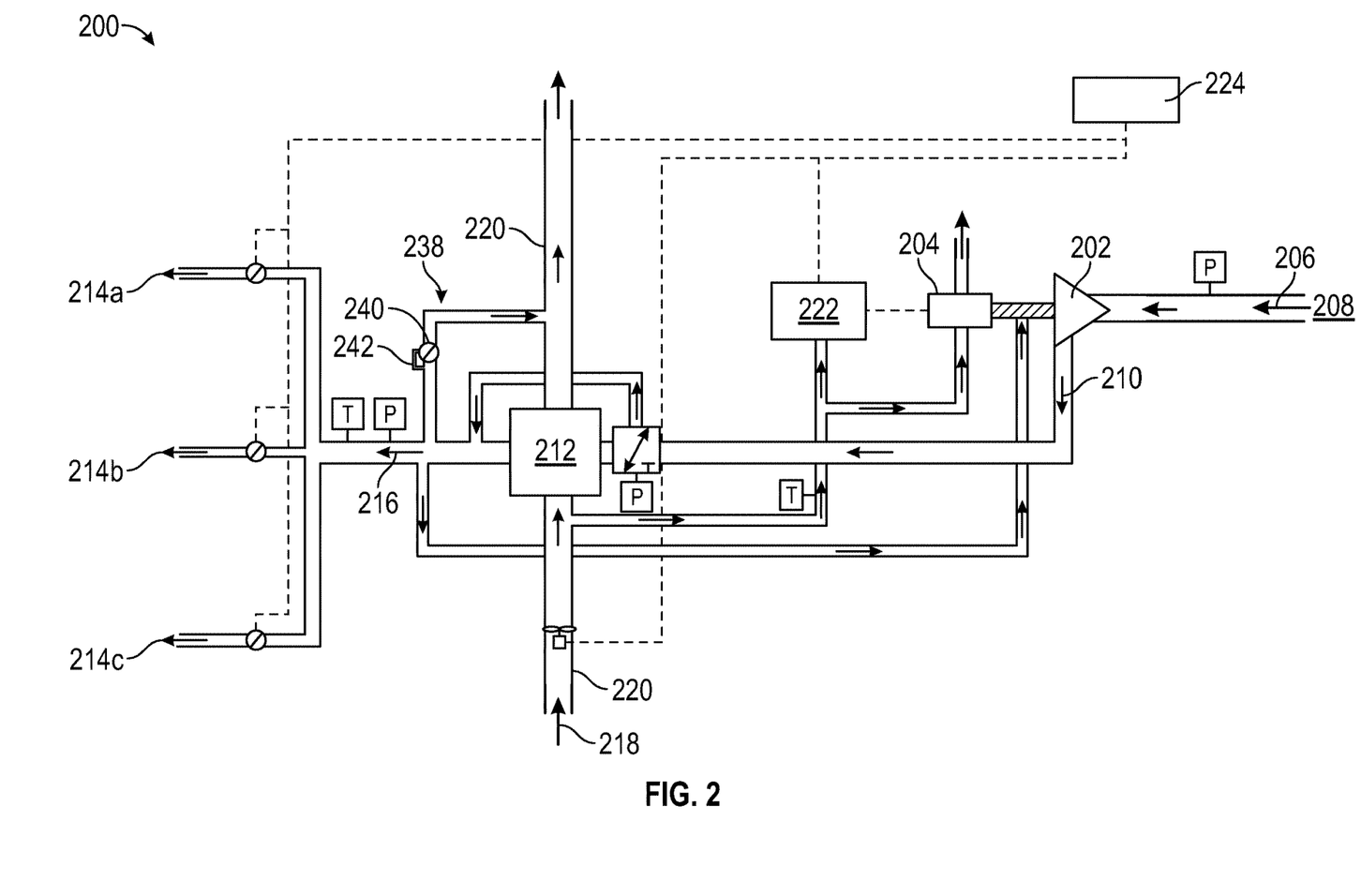
FIG. 2 is a schematic diagram of a pneumatic air system of an aircraft in accordance with an embodiment of the present disclosure.

Turning now to FIG. 2, a schematic diagram of a pneumatic air system 200 of an aircraft, in accordance with an embodiment of the present disclosure. The pneumatic air system 200 is substantially similar to the configuration shown in FIG. 1. The pneumatic air system 200 includes a compressor 202 that is driven by a motor 204. The compressor 202 is configured to receive air 206 from an air supply 208 to compress such air 206 to increase a pressure thereof to generate compressed air 210. The compressed air 210 is directed through a heat exchanger 212 where the compressed air 210 is temperature treated using treating air 218 prior to supplying compressed and temperature treated air 216 to one or more aircraft systems 214*a-c*. The motor 204 is controlled by a motor controller 222 that in turn is controlled by a system controller 224.

The pneumatic air system 200 includes a surge prevention circuit 238. In this non-limiting embodiment, the surge prevention circuit 238 is arranged downstream of the heat exchanger 212 to extract a portion of the compressed and temperature treated air 216 and direct it into a treating air duct 220. The surge prevention circuit 238 includes a surge prevention valve 240 and a sense line 242, as described above. In this embodiment, the surge prevention circuit 238 dumps the extracted air to a position downstream from the heat exchanger 212 along the treating air duct 220.

Figure 3:
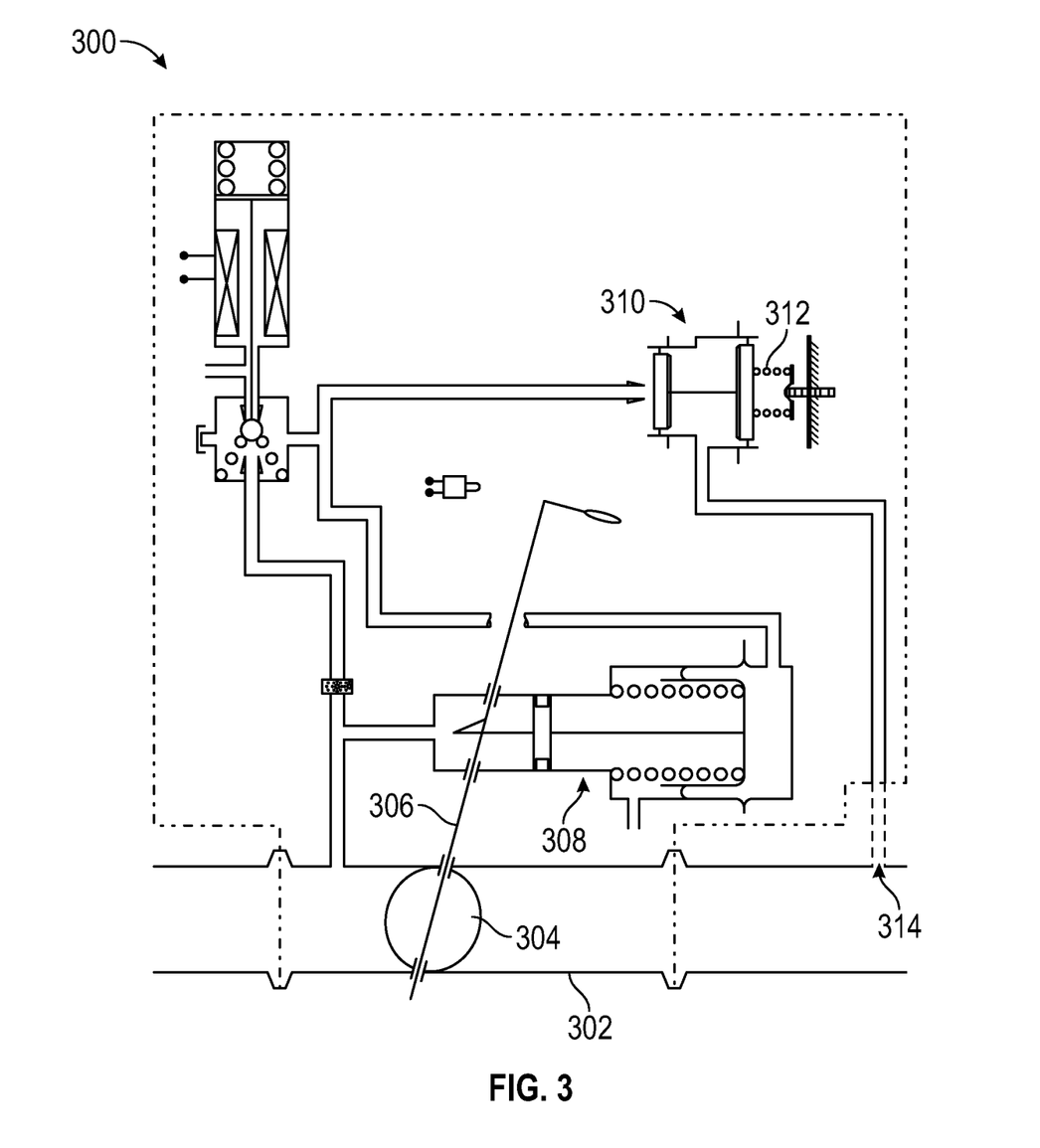
FIG. 3 is a schematic diagram of a pneumatic valve in accordance with an embodiment of the present disclosure.

Turning now to FIG. 3, a schematic diagram of a surge prevention valve 300 of a surge prevention circuit in accordance with an embodiment of the present disclosure is shown. The surge prevention valve 300 is an example mechanical or pneumatic valve configuration that may be incorporated into embodiments of the present disclosure. It will be appreciated that other types of valves may be employed without departing from the scope of the present disclosure.

The surge prevention valve 300 is arranged along a flow path 302 that may be arranged to dump high pressure air from a pneumatic air system, such as into an air duct, overboard, or direct such air elsewhere in order to reduce a pressure within the pneumatic air system. The surge prevention valve 300 includes a flow restrictor 304 arranged within the flow path 302. The flow restrictor 304 may be in a normally closed state to prevent flow through the flow path 302. The flow restrictor 304, in some non-limiting embodiments, may be a disk that is rotatable within the flow path 302. The flow restrictor 304, in this illustrative embodiment, is controlled by a control rod 306 which may be actuated by a piston system 308. The piston system 308 is operated by a pressure differential that is controlled by a pressure controller 310. The pressure controller 310 is fluidly coupled to a portion of the flow path 302 and includes a biasing element 312 that may be controlled with a biasing value set to respond to pressure(s) outside of a predetermined or preset value/range. The pressure controller 310 may be a mechanical device or system that is driven, in part, by fluid pressure within or from the flow path 302 and may be part of a sense line 314. If the pressure within the sense line 314 reaches or exceeds the biasing (spring) coefficient of the biasing element 312, the pressure controller 310 will change position (actuate) causing the piston system 308 to operate and cause movement or rotation of the control rod 306 and thus cause rotation of the flow restrictor 304. In the normal state of operation, the flow restrictor 304 may be closed, thus preventing flow through the flow path 302. However, if the pressure within the sense line 314 reaches or exceeds a threshold, the flow restrictor 304 will be caused to transition to an open state, thus allowing fluid flow through the flow line 302. When the pressure within the flow path 302 returns to levels that are less than the biasing constant of the biasing element 312, the system will reverse, and the flow restrictor 304 will close and again block flow through the flow path 302.

It will be appreciated that the surge prevention valve 300 of FIG. 3 is merely an example of a mechanical (e.g., pneumatic) valve that may be incorporated into embodiments of the present disclosure. As noted above, other types of flow restrictors or valves may be used without departing from the scope of the present disclosure.

Embodiments of the present disclosure may also incorporate alternative operation of the motor controller and how it is configured to drive operation of the motor and thus the compressor of the aircraft pneumatic air system. Conventionally, cabin air compressors control flow through the compressor by varying compressor speed. That is, the motor controller is operated to drive rotation of the compressor blades at varying compressor speeds. In the event of compressor surge, the motor controller and motor drive the compressor at relatively lower speed(s) as the compressor approaches surge, to mitigate increased pressures in the downstream portions of the pneumatic air system.

Figure 4:
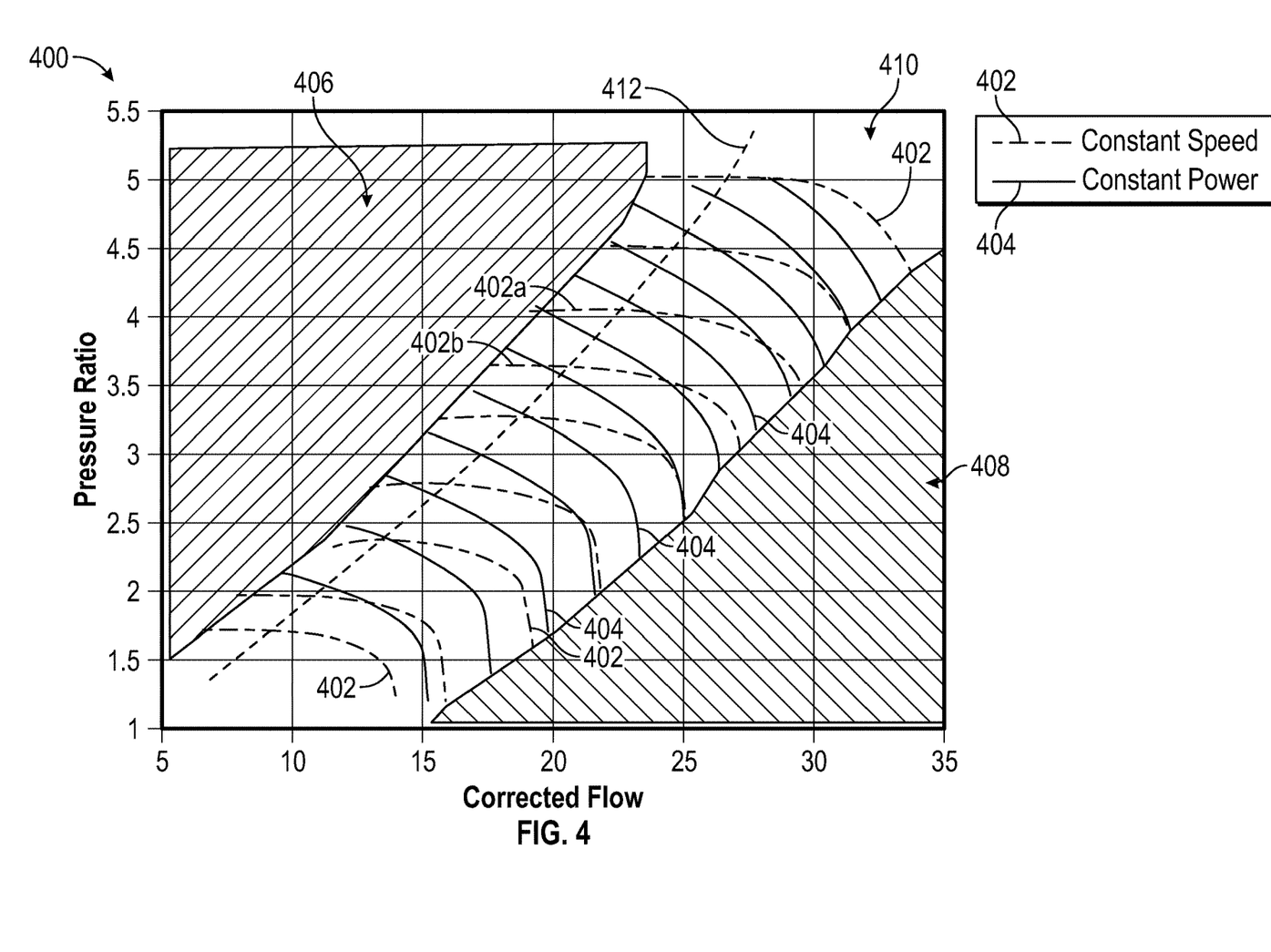
FIG. 4 is a schematic plot illustrating flow as a function of pressure ratio when comparing constant speed or constant power operation of a compressor of a pneumatic air system of an aircraft.

Referring now to FIG. 4, a schematic plot 400 illustrating flow as a function of pressure ratio across a compressor of an aircraft pneumatic air system is shown. A first set of curves 402 represents maintaining operation of the compressor at constant power and a second set of curves 404 represents maintaining operation of the compressor at constant power. In a surge region 406, the pressure ratio is too high and the flow too low for proper operation of the compressor. In a stone wall region 408, the flow is too high and the pressure ratio too low for proper operation of the compressor. The operational envelop 410 of the compressor is defined between these two regions 406, 408. A peak operating efficiency 412 is defined as the ideal pressure ratio-to-flow for peak operating efficiency of the compressor, with the line of the peak operating efficiency 412 being defined within the operational envelop 410.

In the plot 400, surge occurs at the left side of each line of the set of curves 402, 404, and stone walling occurs to the right side of each line of the set of curves 402, 404. In systems that incorporate a constant speed (curves 402), as surge is approached (e.g., flow decreases), —the target speed of operation (e.g., which curve 402 is employed) is reduced, which shifts location on the plot 400 (e.g., from curve 402a to curve 402b). However, because each curve 402 has an essentially zero slope (e.g., flat line on plot 400), it is very difficult to determine when surge is being approached as there is no detectable change in the pressure ratio-to-flow curve (i.e., small sensitivity). This can cause issues where the target speed of the compressor is changed at an inefficient time/operation, or the change does not occur quickly enough, and surge occurs.

However, by incorporating embodiments of the present disclosure and operating the compressor at a constant power (as compared to constant speed), detecting of approaching surge is significantly improved. Further, when surge is approached, high pressure air within the system can be dumped or removed from the system, thus preventing a surge event. That is, as illustrated, operating the compressor at a constant power (curves 404) creates a larger sensitivity (due to larger slope) from flow-to-pressure which may be useful when relying upon the mechanical pressure control system to avoid surge, as described herein. That is, the second set of curves 404 (constant power) represent a larger range of pressure ratios (larger curve slope) than the first set of curves 402 (constant speed). As such, operating the compressor at a constant power provides for a larger change in system response (i.e., pressure ratio) due to changes in system operation(s) external to the compressor. This larger change to compressor operation can provide for improved feedback mechanisms to the control system as compared to constant speed systems.

As noted above, the described pneumatic air systems are for aircraft applications. The pneumatic air systems described herein may be implemented onboard various aircraft, including helicopters and airplanes. In aircraft configurations that do not include ram inlets, the supply of air into the compressor and/or to the heat exchanger of the pneumatic air systems may be sourced from other locations onboard the respective aircraft. For example, scoops, air inlets, cabin air, or other ambient and/or onboard air sources may be used for either or both air sources of the described pneumatic air systems.

Figure 5:
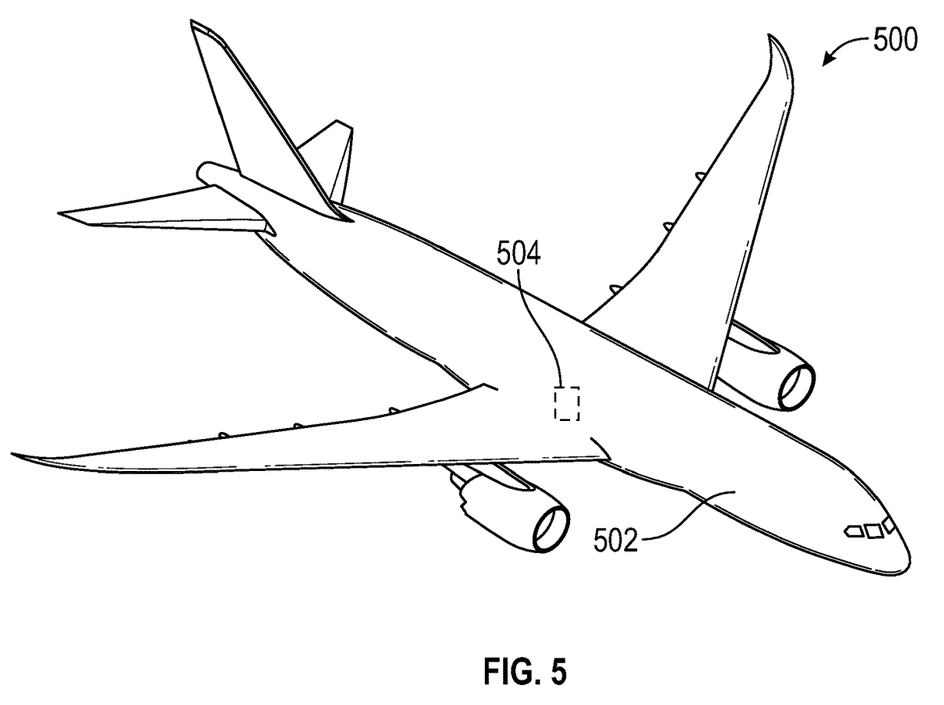
FIG. 5 is a schematic illustration of an aircraft that may incorporate embodiments of the present disclosure.
Figure 6:
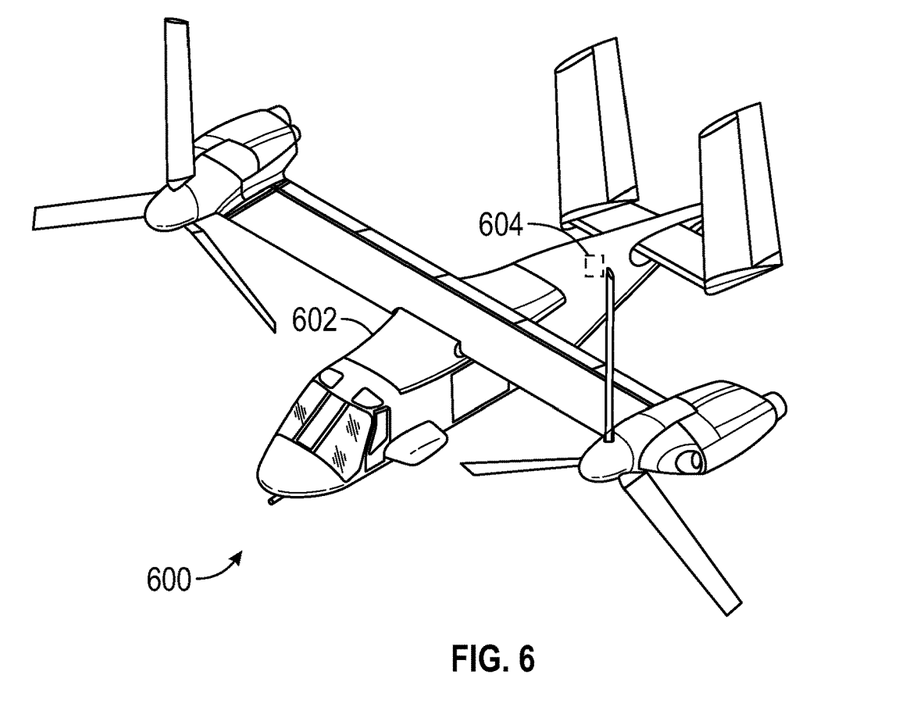
FIG. 6 is a schematic illustration of an aircraft that may incorporate embodiments of the present disclosure.

Turning to FIGS. 5-6, schematic illustrations of various aircraft that may incorporate embodiments of the present disclosure are shown. FIG. 5 illustrates a fixed wing aircraft 500 having an aircraft body 502 with a pneumatic air system 504 in accordance with an embodiment of the present disclosure, installed thereon. FIG. 6 illustrates a rotary blade aircraft 600 having an aircraft body 602 with a pneumatic air system 604 in accordance with an embodiment of the present disclosure, installed thereon. The pneumatic air systems 504, 604 may be configured and arranged onboard the aircraft 500, 600 as appropriate and as understood by those of skill in the art. In some embodiments, the pneumatic air systems of the present disclosure may be installed on or in wings of the aircraft, within a fuselage, or otherwise arranged onboard an aircraft. The source of air for both the compression (onboard use) and the temperature treatment (within the heat exchanger) may be sourced from the ambient (e.g., ram air or scoop), may be sourced from an engine of the aircraft, may be sourced from air sources onboard the aircraft, or combination thereof. Further, although only two example aircraft are shown, those of skill in the art will appreciate that other aircraft (e.g., helicopters, prop-planes, etc.) may incorporate embodiments of the present disclosure without departing from the scope described herein.

Advantageously, embodiments described herein provide for mechanical surge protection that operates passively. Conventional compressor surge prevention configurations may rely on an active feedback digital control design. Such digital control systems require communication between sensors and processors to enable the control and prevent surge. In order to compensate for the latency time between the controller and the sensor(s)/actuator(s), the dynamics requirements of the sensor(s)/actuator(s) will be tightened to achieve a required control bandwidth for compressor surge protection. The tightened dynamics requirements may impose increased costs, response time, sensitivity, or the like, and thus surge protection either may be costly, complex, and/or not as responsive as may be desired. Embodiments of the present disclosure are directed to passive surge control that has the potential to reduce the hardware cost and control design complexity compared with conventional active digital feedback control. Further, advantageously, the compressor of such systems that incorporate a mechanical/passive surge protection system may also be configured to drive the compressor at constant power.

The use of the terms "a", "an", "the", and similar references in the context of description (especially in the context of the following claims) are to be construed to cover both the singular and the plural, unless otherwise indicated herein or specifically contradicted by context. The modifiers "about" and "substantially" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A pneumatic air system for use onboard an aircraft comprising:
   a compressor configured to receive air from an air supply and increase a pressure of said received air to generate compressed air;
   a heat exchanger configured to receive the compressed air as a first working fluid and a treating air as a second working fluid, the heat exchanger configured to convert the compressed air to compressed and temperature treated air;
   one or more aircraft systems configured to receive the compressed and temperature treated air; and
   a surge prevention circuit arranged to prevent surge of air at the compressor, wherein the surge prevention circuit comprises a mechanical valve that is actuated based on a detected pressure within a sense line operably coupled to the mechanical valve.

2. The pneumatic air system of claim 1, further comprising an electric motor operably coupled to the compressor and configured to drive operation of the compressor.

3. The pneumatic air system of claim 2, wherein the electric motor is configured to drive the compressor at a constant power.

4. The pneumatic air system of claim 2, further comprising a motor controller operably coupled to the electric motor.

5. The pneumatic air system of claim 1, wherein the sensor line is fluidly coupled to a location upstream of the heat exchanger and monitors a pressure of the compressed air.

6. The pneumatic air system of claim 1, wherein the sensor line is fluidly coupled to a location downstream of the heat exchanger and monitors a pressure of the compressed and temperature treated air.

7. The pneumatic air system of claim 1, wherein the one or more aircraft systems comprises one or more of an onboard oxygen generating system, an onboard inert gas generation system, or an ice prevention system.

8. The pneumatic air system of claim 1, wherein the air supply for the compressor and a source of the treating air is the same air source.

9. The pneumatic air system of claim 1, wherein the air supply for the compressor is ram air.

10. The pneumatic air system of claim 1, wherein a source of the treating air for the second working fluid of the heat exchanger is ram air.

11. The pneumatic air system of claim 1, wherein the surge prevention circuit is configured to direct air overboard when the mechanical valve is in an open state.

12. The pneumatic air system of claim 11, wherein the mechanical valve is configured to be in a closed state unless a predetermined pressure threshold is detected within the sense line.

13. An aircraft comprising:
   an aircraft body; and
   a pneumatic air system installed on the aircraft, the pneumatic air system comprising:
      a compressor configured to receive air from an air supply and increase a pressure of said received air to generate compressed air;
      a heat exchanger configured to receive the compressed air as a first working fluid and a treating air as a second working fluid, the heat exchanger configured to convert the compressed air to compressed and temperature treated air;
      one or more aircraft systems configured to receive the compressed and temperature treated air; and
      a surge prevention circuit arranged to prevent surge of air at the compressor, wherein the surge prevention circuit comprises a mechanical valve that is actuated based on a detected pressure within a sense line operably coupled to the mechanical valve.

14. The aircraft of claim 13, wherein the aircraft is a fixed winged aircraft.

15. The aircraft of claim 13, wherein the aircraft is a rotary blade aircraft.

16. The aircraft of claim 13, further comprising a ram air duct, wherein the heat exchanger is arranged within the ram air duct.

17. The aircraft of claim 13, wherein the one or more aircraft systems comprises one or more of an onboard oxygen generating system, an onboard inert gas generation system, or an ice prevention system.

18. The aircraft of claim 13, further comprising an electric motor operably coupled to the compressor and configured to drive operation of the compressor.

19. The aircraft of claim 18, wherein the electric motor is configured to drive the compressor at a constant power.

20. The aircraft of claim 13, wherein the surge prevention circuit is configured to direct air overboard when the mechanical valve is in an open state.

* * * * *